United States Patent
Moriyama

(10) Patent No.: US 6,648,948 B1
(45) Date of Patent: Nov. 18, 2003

(54) HIGH PERFORMANCE DUST COLLECTOR

(76) Inventor: Toshio Moriyama, 235 Chung-Ho Box 8-24, Taipei (TW)

(*) Notice: Subject to any disclaimer, the term of this patent is extended or adjusted under 35 U.S.C. 154(b) by 0 days.

(21) Appl. No.: 10/174,811

(22) Filed: Jun. 20, 2002

(51) Int. Cl.[7] .................................. B03C 3/78
(52) U.S. Cl. .................................. 96/42; 96/62
(58) Field of Search .................. 96/39–42, 28, 96/44, 47, 50, 51, 60, 62, 66, 77, 94; 95/78, 79, 74–76

(56) References Cited

U.S. PATENT DOCUMENTS

| | | | | |
|---|---|---|---|---|
| 1,719,354 A | * | 7/1929 | Alsop | 96/42 |
| 2,100,155 A | * | 11/1937 | Beran | 96/42 |
| 2,212,885 A | * | 8/1940 | Pound et al. | 96/42 |
| 2,298,510 A | * | 10/1942 | Pound et al. | 96/42 |
| 2,331,028 A | * | 10/1943 | Hegan et al. | 96/42 |
| 2,352,061 A | * | 6/1944 | Yost et al. | 96/42 |
| 2,383,111 A | * | 8/1945 | Dahlman | 96/42 |
| 2,383,112 A | * | 8/1945 | Dahlman | 96/42 |
| 2,486,877 A | * | 11/1949 | Ransburg et al. | 96/42 |
| 3,375,638 A | * | 4/1968 | Dungler | 96/39 |
| 4,321,066 A | * | 3/1982 | Masuda | 96/39 |
| 5,110,324 A | * | 5/1992 | Testone et al. | 96/40 |

FOREIGN PATENT DOCUMENTS

| | | | |
|---|---|---|---|
| JP | 53-116576 | * 10/1978 | 96/39 |

* cited by examiner

*Primary Examiner*—Richard L. Chiesa

(57) ABSTRACT

A high performance dust collector has a main body. The main body includes a suction tube, a discharging electrode, a discharging plate, a dust accumulating electrode, and an exhaust tube. When exhaust gas from the burnt light or heavy diesel oil enters into the suction tube, since the exhaust gas passes through the discharging electrode and the discharging plate with negative charges, the coal particles in the exhaust gas become anions. When the waste gas passes through the metal net transfer belt, the coal particles with anions will adhere to the metal net transfer belt since the dust accumulating electrode is connected to a positive voltage end. Thereby, air exhausted from the exhaust tube has been cleaned and thus has no coal particles.

5 Claims, 1 Drawing Sheet

HIGH PERFORMANCE DUST COLLECTOR

FIELD OF THE INVENTION

The present invention relates to dust collectors, and particularly to a high performance dust collector which can remove coal particles in an exhaust tube. Thereby, the exhaust gas will not pollute air and thus not hurt the people's health.

BACKGROUND OF THE INVENTION

Exhaust gas from the burnt light or heavy diesel oil produces coal particles. If this gas is vented to the air directly, the air will be polluted and people's health will be threatened by diseases about air pollution.

In some prior art design, the coal particles are removed by polarization and then polarized coal particles are beaten so as to achieve the object of dust accumulation. However, this prior art can not achieve a preferred effect. The polarized coal particles can still mix in the air so that the effect is reduced greatly.

SUMMARY OF THE INVENTION

Accordingly, the primary object of the present invention is to provide a high performance dust collector having a main body comprising a suction tube, a discharging electrode, a discharging plate, a dust accumulating electrode, and an exhaust tube. When exhaust gas from the burnt light or heavy diesel oil enters into the suction tube, since the exhaust gas passes through the discharging electrode and the discharging plate having negative charges, the coal particles in the exhaust gas become anions. When the waste gas passes through the metal net transfer belt, since the dust accumulating electrode is connected to a positive voltage, the coal particles with anions will adhere to the metal net transfer belt. Thereby, air exhausted from the exhaust tube has been cleaned and thus has no coal particles.

The various objects and advantages of the present invention will be more readily understood from the following detailed description when read in conjunction with the appended drawing.

DETAILED DESCRIPTION OF THE PREFERRED EMBODIMENTS

Figure 1:
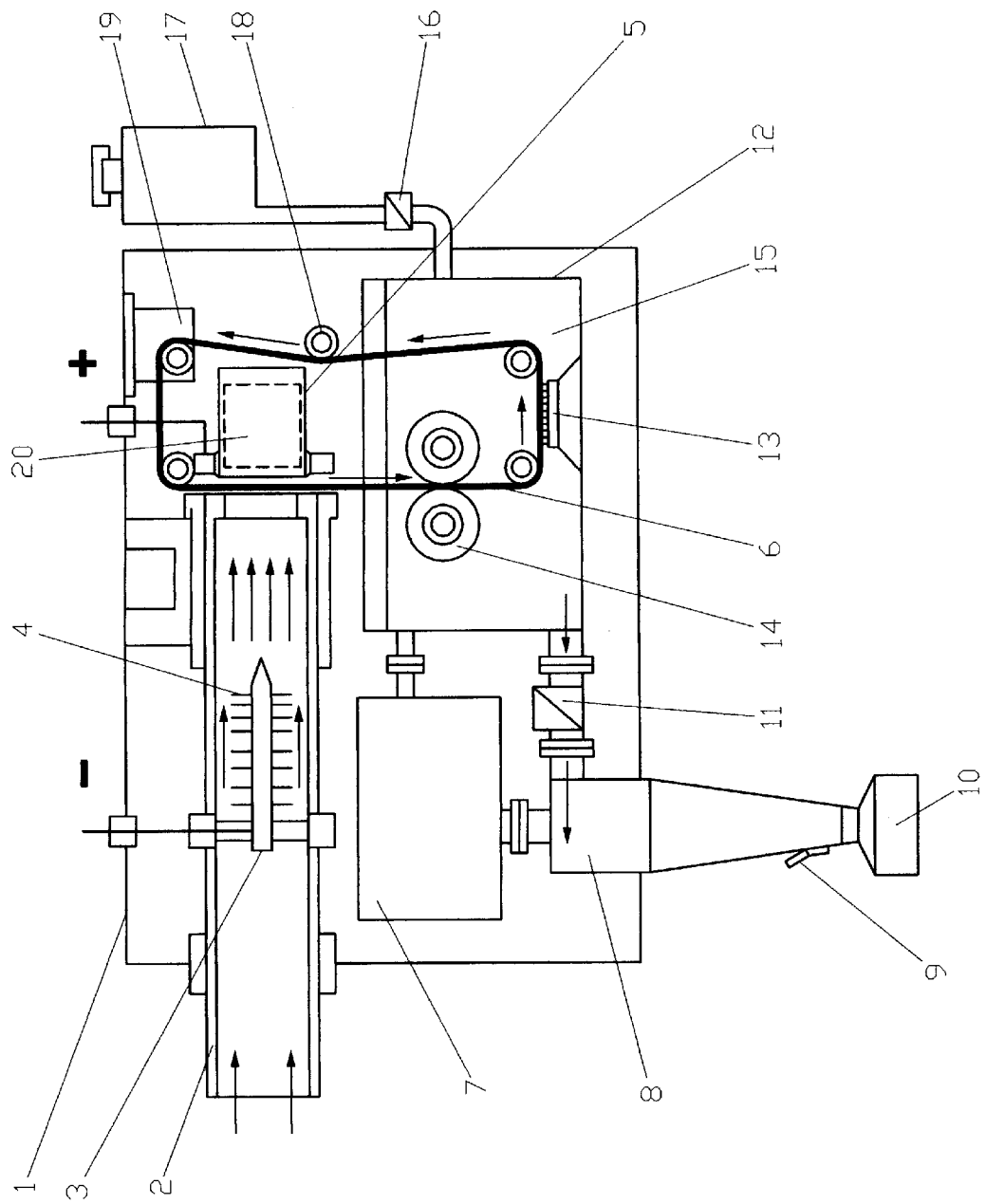
FIG. 1 is a structural schematic view of the present invention.

Referring to FIG. 1, the high performance dust collector of the present invention is illustrated. The main body 1 of the high performance dust collector according to the present invention includes a suction tube 2, a discharging electrode 3, a discharging plate 4, a dust accumulating electrode 5, an exhaust tube 20, etc.

The suction tube 2 serves for guiding the exhausting gas with coal dust from the burnt light or heavy oil.

The discharging electrode 3 and discharging plate 4 are installed within the suction tube 2. The discharging electrode 3 and the discharging plate 4 are connected to a negative electrode.

The dust accumulating electrode 5 is connected to a positive voltage.

The metal net transfer belt 6 is installed to a distal end of the suction tube

All the gas passing through the distal end of the suction tube 2 will pass through the metal net transfer belt 6. The metal net transfer belt 6 is formed with a plurality of small holes. The metal net transfer belt 6 is formed between the suction tube 2 and the dust accumulating electrode 5.

The exhaust tube 20 is installed at a rear side of the dust accumulating electrode 5.

When exhaust gas from the burnt light or heavy diesel oil enters into the suction tube 2, since the exhaust gas passes through the discharging electrode 3 and the discharging plate 4 having negative charges, the coal particles in the exhaust gas become anions. When the waste gas passes through the metal, net transfer belt 6, since the dust accumulating electrode 5 is connected to a positive voltage, the coal particles with anions will adhere to the metal net transfer belt 6. Thereby, air exhausted from the exhaust tube 20 has been cleaned and thus has no coal particles.

Since the metal net transfer belt 6 is like a circle and thus it can be used repeatedly. In the present invention, a cleaning device is installed for cleaning metal net transfer belt 6 with coal particles. The cleaning device includes a cleaning liquid tank 12, a fixing cleaner 13, and a rotary cleaner 14. Cleaning liquid 15 is filled into the cleaning liquid tank 12. By the rotation of the metal net transfer belt 6, the metal net transfer belt 6 will pass through the rotary cleaner 14 and the fixing cleaner 13 firstly for cleaning. Thereby, the coal particles in the exhaust air can be removed. The cleaning liquid 15 with coal particles can be removed by being further installed with an impurity waste water separator 8 and a high pressure injecting pump 11. For preventing an over-high temperature of the cleaning liquid 15, a liquid cooler 7 can be further installed for reducing temperature properly. To compensate the cleaning liquid 15 due to evaporation, a water supplier 17 and an automatic water supply adjuster 16 are installed, which are connected to the cleaning liquid tank 12 for supplying water continuously so as to sustain the cleaning liquid 15 in the cleaning liquid tank 12. The cleaning liquid 15 can be selected according to the kinds of the exhaust gas to be processed.

In the present invention, the transfer speed of the metal net transfer belt 6 is adjustable according to the kind and volume of the exhaust gas. It is performed by a speed change device 19, and an adjust pulley 18.

In the present invention, a dust accumulating handle 9 and a dust accumulating box 10 are installed for switching the door of the dust accumulating box.

Although the present invention has been described with reference to the preferred embodiments, it will be understood that the invention, is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A high performance dust collector having a main body comprising a suction tube, a discharging electrode, a discharging plate, a dust accumulating electrode, an exhaust tube; wherein the suction tube serves for guiding exhausting gas;

the discharging electrode and discharging plate are installed within the suction tube; the discharging electrode and the discharging plate are connected with a negative voltage end;

the dust accumulating electrode is connected to a positive voltage end;

a metal net transfer belt is installed to a distal end of the suction tube and is formed with a plurality of small holes; the metal net transfer belt is formed between the suction tube and the dust accumulating electrode; and the exhaust tube is installed at a rear side of the dust accumulating electrode.

2. The high performance dust collector as claimed in claim 1, wherein the main body includes a cleaning liquid tank, a fixing cleaner, and a rotary cleaner; cleaning liquid is filled into the cleaning liquid tank; by the rotation of the metal net transfer belt, the metal net transfer belt will pass through the rotary cleaner and the fixing cleaner firstly for cleaning; thereby, the coal particles in the exhaust air are removed.

3. The high performance dust collector as claimed in claim 1, wherein the main body further is installed with an impurity waste water separator and a high pressure injecting pump for removing impurities in the cleaning liquid.

4. The high performance dust collector as claimed in claim 1, wherein the cleaning liquid in the main body of the high performance dust collector is transferred to a liquid cooler.

5. The high performance dust collector as claimed in claim 1, wherein the main body of the high performance dust collector is installed with a water supplier and an automatic water supply adjuster.

* * * * *